US010395292B1

(12) United States Patent
Graham et al.

(10) Patent No.: US 10,395,292 B1
(45) Date of Patent: Aug. 27, 2019

(54) AUGMENTED REALITY ELECTRONIC DEVICE USING FACIAL RECOGNITION FUNCTIONALITY AND DISPLAYING SHOPPING REWARD AT RETAIL LOCATIONS

(71) Applicant: Wells Fargo Bank, N.A., San Francisco, CA (US)

(72) Inventors: Marsha Lynn Graham, Monroe, NC (US); Laurie Ann Robinson, Billings, MT (US); Kourtney Eidam, Sunnyside, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 800 days.

(21) Appl. No.: 14/265,620

(22) Filed: Apr. 30, 2014

(51) Int. Cl.
*G06Q 30/06* (2012.01)

(52) U.S. Cl.
CPC ................... *G06Q 30/0623* (2013.01)

(58) Field of Classification Search
CPC ........... G06Q 30/0601; G06Q 30/0631; G06Q 30/0641; G06Q 30/0643
See application file for complete search history.

(56) References Cited

U.S. PATENT DOCUMENTS

| 6,641,037 | B2 | 11/2003 | Williams |
| 8,282,491 | B2 | 10/2012 | Auterio et al. |
| 8,407,086 | B2 | 3/2013 | Kusumoto et al. |
| 8,438,110 | B2 | 5/2013 | Calman et al. |
| 2003/0158796 | A1* | 8/2003 | Balent ................ G06Q 30/0633 705/28 |
| 2008/0226119 | A1* | 9/2008 | Candelore ........... G06F 16/5838 382/100 |
| 2008/0279481 | A1* | 11/2008 | Ando ................. G06Q 30/0601 382/306 |
| 2009/0063307 | A1* | 3/2009 | Groenovelt .......... G06Q 10/087 705/28 |
| 2009/0128335 | A1* | 5/2009 | Leung .................... G06Q 30/02 340/572.1 |
| 2010/0016080 | A1 | 1/2010 | Garden et al. |
| 2010/0046842 | A1* | 2/2010 | Conwell ................ G06K 9/228 382/218 |
| 2010/0048290 | A1 | 2/2010 | Baseley et al. |
| 2011/0029364 | A1 | 2/2011 | Roeding et al. |
| 2011/0124390 | A1 | 5/2011 | Wilen |
| 2011/0213664 | A1 | 9/2011 | Osterhout et al. |

(Continued)

OTHER PUBLICATIONS

Findling, Rainhard D., and Rene Mayrhofer. "Towards face unlock: on the difficulty of reliably detecting faces on mobile phones." Proceedings of the 10th International Conference on Advances in Mobile Computing & Multimedia. ACM, 2012. (Year: 2012).*

(Continued)

*Primary Examiner* — Christopher B Seibert
(74) *Attorney, Agent, or Firm* — Merchant & Gould P.C.

(57) ABSTRACT

A method implemented on an augmented reality (AR) electronic device includes identifying a retail store at a current location of a user of the AR electronic device. An identity of the retail store is sent to a server computer. Information is received from the server computer regarding rewards card programs offered by the retail store. The information regarding the rewards card programs offered by the retail store is displayed on the AR electronic device.

9 Claims, 6 Drawing Sheets

(56) References Cited

U.S. PATENT DOCUMENTS

| | | | |
|---|---|---|---|
| 2011/0221657 A1* | 9/2011 | Haddick | G02B 27/017 345/8 |
| 2011/0258049 A1 | 10/2011 | Ramer et al. | |
| 2012/0122554 A1 | 5/2012 | Paquet et al. | |
| 2012/0183172 A1 | 7/2012 | Stroila | |
| 2012/0191518 A1 | 7/2012 | Nix et al. | |
| 2012/0212400 A1 | 8/2012 | Border et al. | |
| 2012/0231424 A1 | 9/2012 | Calman et al. | |
| 2012/0231814 A1 | 9/2012 | Calman et al. | |
| 2012/0232937 A1 | 9/2012 | Calman et al. | |
| 2012/0232966 A1 | 9/2012 | Calman et al. | |
| 2012/0232968 A1 | 9/2012 | Calman et al. | |
| 2012/0232976 A1 | 9/2012 | Calman et al. | |
| 2012/0232977 A1 | 9/2012 | Calman et al. | |
| 2012/0233015 A1 | 9/2012 | Calman et al. | |
| 2012/0233032 A1 | 9/2012 | Calman et al. | |
| 2012/0233072 A1 | 9/2012 | Calman et al. | |
| 2012/0256954 A1 | 10/2012 | Soon-Shiong | |
| 2012/0290366 A1* | 11/2012 | Giles | G06Q 30/02 705/14.1 |
| 2013/0033522 A1 | 2/2013 | Calman et al. | |
| 2013/0051548 A1 | 2/2013 | Chavez | |
| 2013/0170697 A1 | 7/2013 | Zises | |
| 2013/0179303 A1* | 7/2013 | Petrou | G06Q 30/06 705/26.61 |
| 2013/0191250 A1 | 7/2013 | Bradley et al. | |
| 2013/0197992 A1 | 8/2013 | Bao | |
| 2013/0210523 A1 | 8/2013 | Arumugam et al. | |
| 2013/0218886 A1 | 8/2013 | Graham et al. | |
| 2013/0238413 A1 | 9/2013 | Carlson et al. | |
| 2013/0278631 A1 | 10/2013 | Border et al. | |
| 2013/0281208 A1 | 10/2013 | Lyons et al. | |
| 2013/0290106 A1 | 10/2013 | Bradley et al. | |
| 2014/0028712 A1* | 1/2014 | Keating | G06T 19/006 345/633 |
| 2014/0100996 A1* | 4/2014 | Klein | G06O 30/0643 705/27.2 |
| 2014/0100997 A1* | 4/2014 | Mayerle | G06Q 30/0643 705/27.2 |
| 2014/0143105 A1* | 5/2014 | Shaw | G06Q 10/06311 705/30 |
| 2014/0152847 A1* | 6/2014 | Zomet | G06Q 30/0629 348/207.1 |
| 2016/0295038 A1 | 10/2016 | Rao et al. | |

OTHER PUBLICATIONS

U.S. Appl. No. 14/265,604, filed Apr. 30, 2014 entitled "Augmented Reality Store and Services Orientation Gamification".

Johnson, "Kellogg differentiates augmented reality efforts with entertainment," http://www.mobilemarketer.com/cms/news/software-technology/16473.html, Mobile Marketer, Oct. 28, 2013, 4 pages.

Rohs, "Marker-Based Embodied Interaction for Handheld Augmented Reality Games," http://citeseerx.ist.psu.edu/viewdoc/summary?doi=10.1.1.83.630, 2006, CiteSeerXβ Journal of Virtual Reality and Broadcasting, 1 page.

Fiorletta, "IBM Unveils Augmented Reality Mobile Shopping App for In-Store Engagement," http://www.retailtouchpoints.com/mobile/1737-ibm-unveils-augmented-reality-mobile-sho>, retail TouchPoints, Jul. 20, 2012, 7 pages.

Greengard, "Retail Turns to Tech to Transform the In-Store Experience," <URL: http://eu.cmo.com/content/cmo-eu/home/articles/2013/9/23/retail_turns_to_tech.print.html>, CMO, Oct. 8, 2013, 5 pages.

Langley, "Food retail apps and innovative loyalty software platform launched in Australia," http://ausfoodnews.com.au/2013/10/23/food-retail-apps-and-innovative-loyalty-software-platform-launched-in-australia.html, AFN Thought for Food, Oct. 23, 2013, 3 pages.

U.S. Appl. No. 15/388,343, filed Dec. 22, 2016 entitled "Augmented Reality Shopping Rewards".

* cited by examiner

AUGMENTED REALITY ELECTRONIC DEVICE USING FACIAL RECOGNITION FUNCTIONALITY AND DISPLAYING SHOPPING REWARD AT RETAIL LOCATIONS

BACKGROUND

Augmented reality is a technology in which a person's conception of reality can be enhanced, typically through augmented sound, video or graphics displays. The augmentation is typically implemented via various technologies, such as a headset that may be worn by the person. One or more augmented views may be presented to the person through the headset.

The augmented reality headset typically includes a wearable computer and an optical display mounted to the headset. The wearable computer may include a wireless telecommunication capability, permitting a wireless connection from the wearable computer to a server computer. Because of the wireless telecommunication capability, the augmented reality headset may be used to interact with the server computer to accomplish various tasks.

SUMMARY

Embodiments of the disclosure are directed to a method implemented on an augmented reality (AR) electronic device, the method comprising: identifying a retail store at a current location of a user of the AR electronic device; sending the identity of the retail store to a server computer; receiving from the server computer information regarding rewards card programs offered by the retail store; and displaying on the AR electronic device the information regarding the rewards card programs offered by the retail store.

In another aspect, a method implemented on an augmented reality (AR) electronic device comprises: identifying a product with the AR electronic device; identifying a user of the AR electronic device; sending the identity of the product and the identity of the user to a server computer; receiving from the server computer information regarding payment cards for the user that may be used to purchase the product at the retail store; and displaying on the AR electronic device a list of one or more payment cards for the user that offer incentives for purchasing the product.

In yet another aspect, an AR device comprises: a processing unit; and system memory, the system memory including instructions which, when executed by the processing unit, cause the AR device to: identify a product; identify a user of the AR device; obtain a global positioning system (GPS) location of a retail store at the retail store location; send the identity of the product, the identity of the retail store and the identity of the user to a server computer; receive from the server computer information regarding payment cards and loyalty card programs for the user for the product at the retail store; display on the AR device one or more combination of payment cards and loyalty cards owned by the user that offer rewards for purchasing the product, one of the combinations being a combination that offers a best price for the product; and display on the AR device one or more alternate products of a similar product category as the product for which one or more payment cards or loyalty cards for the user may be used.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for using augmented reality (AR) to provide information to users regarding rewards cards and payment cards that may be used for purchasing items when shopping. The information is displayed on a display screen of an AR device.

As used in this disclosure, a rewards card is a card that identifies a card holder as a member in a loyalty program. As used in this disclosure, a loyalty program is a marketing program that rewards customers with discounts for purchases. Typically, the customer needs to show the rewards card when making the purchase in order to obtain the discount. Rewards cards may also be known as loyalty cards, points cards, club cards and advantage cards. Other names for rewards cards are possible.

As used in this disclosure, a payment card is a credit card or a debit card. Many payment cards are also associated with rewards programs. In some rewards programs, a user may obtain cash back for selected purchases made with the payment card. The cash back amount is typically a percentage of the amount of the purchase, for example one percent, five percent, or another percentage. In some rewards programs, rewards points may be used in lieu of cash back. The rewards points may be accumulated and eventually cashed in for products, trips, entertainment, etc. As used in this disclosure rewards may include any combination of cash back, rewards points and discounts.

The systems and methods are generally described for an AR device that may be worn or carried by a user. An example of and AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

One type of AR headset described in this disclosure is a smart glass type of headset, similar to eyeglasses, which may be worn by the user. The user may view AR images in the glass portion of the headset. An example of a smart glass headset is Google Glass, from Google Inc. of Mountain View, Calif.

In order for the AR device to display information regarding the rewards cards and the payment cards, the user of the AR device needs to be identified. Once identified, account information for the user may be obtained. The user of the AR device is typically identified via one of several methods including, facial recognition, retinal scan capability, finger print or voice print. Other methods for identifying the user may be used.

Using the systems and methods, rewards card and payment card information may be displayed to the user on the AR device when the user is shopping. For example, the user may be walking near a retail store at a shopping mall. Based on an identification of the retail store and an identification of the user, the AR device may display information regarding whether the retail store accepts rewards cards for the user. The AR device may also display a list of other similar retail stores nearby that accept rewards cards for the user.

When the user enters the retail store, the user may scan one or more products with the AR device. Using the systems and methods, the AR device may display whether discount programs are available for purchasing the one or more products. In addition, the AR device may display a list of payment cards that offer cash back or rewards points for purchasing the one or more products.

Figure 1:
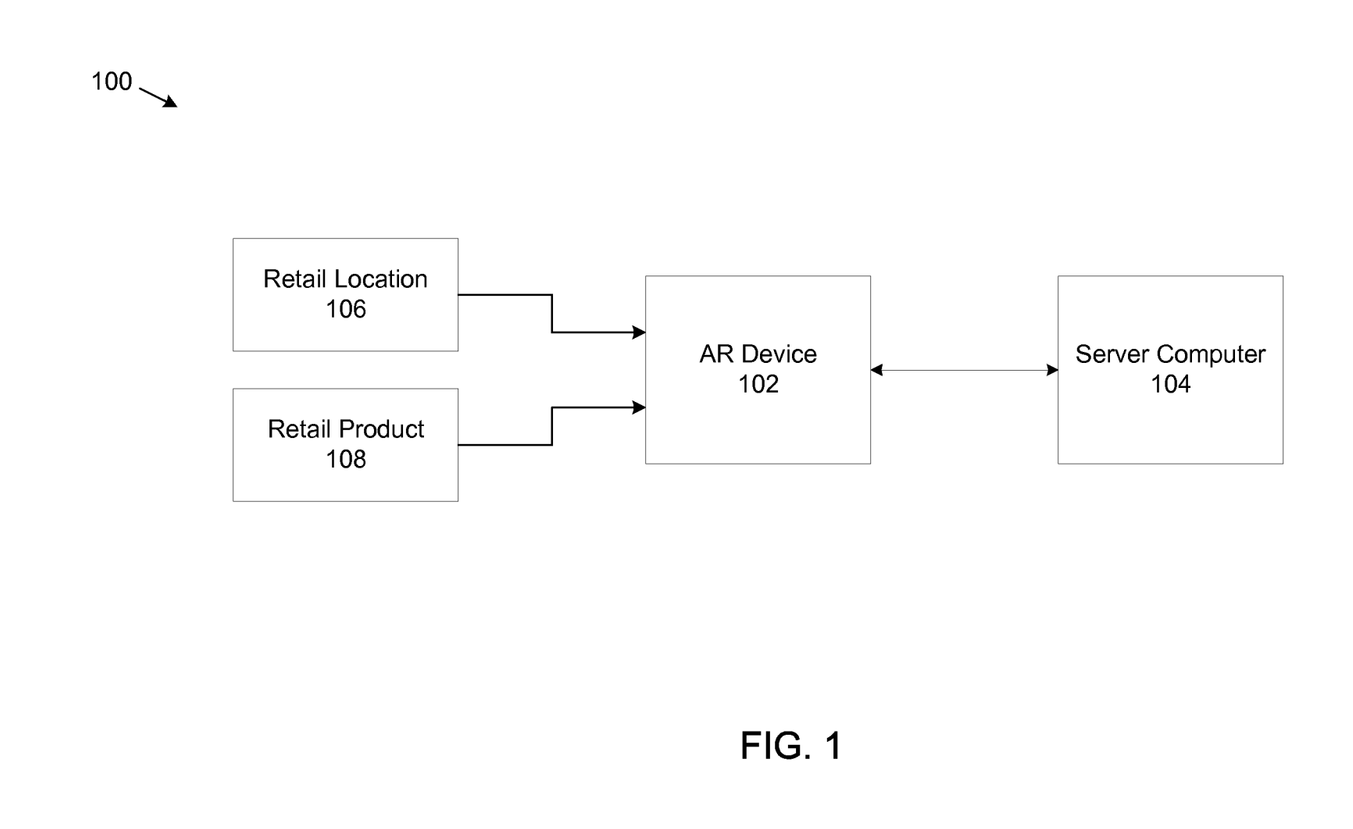
FIG. 1 shows an example system that may be used for augmented reality (AR) display of shopping reward information.

FIG. 1 shows an example system 100 that supports a display of shopping reward information on an AR device. System 100 includes an AR device 102, a server computer 104, a retail location 106 and a retail product 108. The AR device 102 may be an AR headset or a smart telephone or tablet computer having a processor, display, camera and AR software application. The server computer 104 is typically a server computer associated with a financial institution, such as a bank. The retail location 106 is a location of a retail store, for example a location in a shopping mall. The retail product 108 is a product that a user of the AR device 102 may purchase.

In an example implementation, the user may be walking in a shopping mall. As the user walks in the shopping mall the user may stop in front of a retail store in the shopping mall. The user may be curious as to whether the retail store has a rewards program that accepts one or more rewards cards that the user possesses. If so, the user may want to shop in the retail store because the user may be able to obtain discounted prices when using one of the rewards cards to purchase merchandise in the retail store.

The user may initiate an action to obtain information regarding rewards programs for the retail store. For example, the user may issue a verbal command, such as "rewards program" or the user may touch a specific area on AR device 102. In conjunction with initiating the action, the camera on the AR device 102 may scan or take a picture of signage or a logo at the retail store, for example a sign with the name of the retail store or a logo of the retail store. AR device 102 may include object recognition software which may identify the retail store based on the signage or logo.

AR device 102 may also send GPS data for the retail location 106. The GPS data is obtained via GPS software included on AR device 102. In addition, AR device 102 obtains identification information for the user of AR device 102. The identification information is typically obtained by one of facial recognition, retinal scan, voice print or finger print.

AR device 102 sends the identifier for the retail store, the identifier for the user and the GPS data to server computer 104. Server computer 104 determines from this information whether rewards programs are available for the user at the retail location 106. When a determination is made that rewards programs are available for the user at the retail location 106, server computer 104 sends information regarding the rewards programs to AR device 102. When a determination is made that rewards programs are not available for the user at retail location 106, server computer 104 may determine that rewards programs are available for similar retail stores nearby retail location 106. For example, if the retail store at retail location 106 is a home products store, the server computer may determine that there is another home products store nearby retail location 106 in which a rewards program is available for the user.

The information from server computer 104 is displayed to the user on a display screen of AR device 102. Typically, the information is displayed as an overlay on the display screen of AR device 102. In addition to providing information on whether the retail store at retail location 106 accepts rewards cards for the user and in addition to providing alternate locations nearby, the information may include a recommendation as to which of the retail store at the current location or the retails stores at the alternate locations offers better prices or discounts.

In another example implementation, the user may enter a retail store and consider buying a product at the retail store. The user may want to know whether there are any rewards card or payment card discounts available for this product. The user may focus AR device 102 on the product to identify the product. The AR device 102 may be used to identify the product in one of several ways. In one way, the AR device 102 may scan the product or scan an optical code, such as a bar code for the product. The product may be identified by the optical code or by object recognition. In some implementations, near-field communication (NFC) may be used to identify the product.

The user may also initiate an activating action such as a verbal command or touching an area on AR device 102. After the activating action, AR device 102 may send an identifier for the product and an identifier for the user to server computer 104. Server computer 104 may determine whether rewards card or payment card discounts are available for the user when purchasing the product. When this determination is made, server computer 104 may send information to AR device 102 regarding the rewards card and payment card discounts. This information is displayed on the display screen of AR device 102.

In addition to providing information regarding which rewards cards or payment cards may be used to purchase the product, the information may include suggestions or advice for alternate products that may offer better rewards. For example, if the user is interested in purchasing a specific brand of ketchup, server computer 104 may determine that a better combination of reward points, cash back, discounts, etc. may be obtained by buying an alternate brand of ketchup. In addition, if the user has multiple payment cards, the information may indicate which payment card may offer the most rewards. In some implementations, the information may include an optimization of rewards cards and payment cards that provides the best rewards when purchasing the product.

Typically, when a retail store is part of a rewards program, a customer may need to physically present a rewards card when making a rewards program purchase at the retail store. However, using the systems and methods, a rewards card entity may partner with a payment card entity such that when the payment card is used to purchase a product, any discounts from the rewards card are automatically included in the purchase price for the product. In this way, the customer may not need to carry the rewards card or physically present the rewards card when making the purchase.

Using the systems and methods, another way to associate a rewards card with a payment card is via a digital dashboard. The digital dashboard comprises a user interface of a computing device, for example a financial services software application accessible from a smart telephone or tablet computer. As explained in more detail later herein, a user may enter his/her rewards cards and loyalty cards into the user interface. Information regarding the user's rewards cards and loyalty cards are sent to server computer 104.

Figure 2:
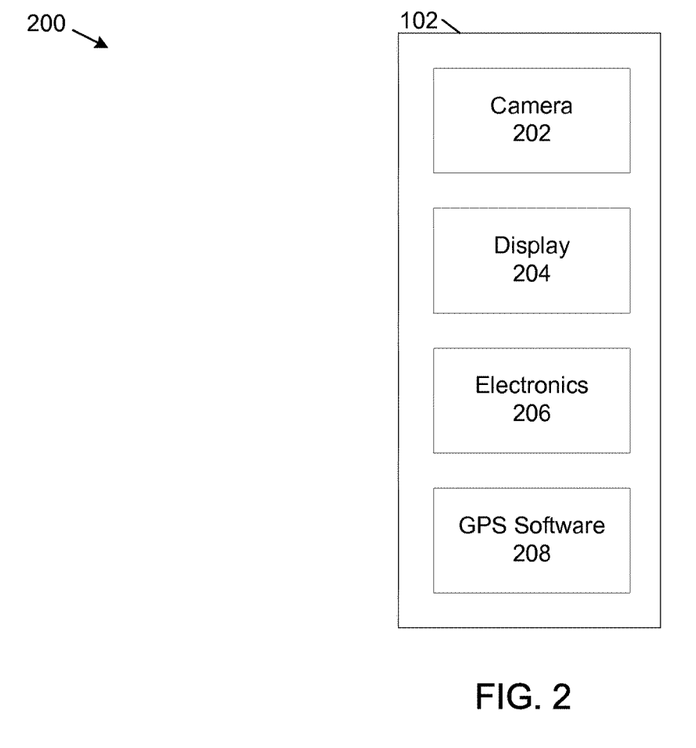
FIG. 2 shows example modules of the AR device of FIG. 1.

FIG. 2 shows example modules 200 of AR device 102. The example modules 200 include a camera 202, a display 204, electronics 206 and GPS software 208. The camera 202 is a camera that is built-in to AR device 102. Display 204 is a display that is also built-in to AR device 102. Electronics 206 includes an electronic computing device with wireless capability. The wireless capability may include Bluetooth, radio frequency identification (RFID) or similar types of wireless capability. GPS software 208 is typically a software application that may be installed on the mobile electronic device. When AR device 102 is an AR headset, camera 202, display, 204, electronics 206 and GPS software 208 are part of the AR headset.

The GPS software 208 determines a GPS position of the retail store. In some implementations, GPS position information of the retail store is sent to the server computer 104. The GPS position information is processed at the server computer 104 and a type of retail store at the GPS position is determined. The processing of the GPS position information may comprise using the GPS position information in an application program interface (API) in which a retail store name and type may be determined from the GPS position information. In some implementations the processing of the GPS position information may include decoding the GPS position information in order to determine an actual GPS position.

Figure 3:
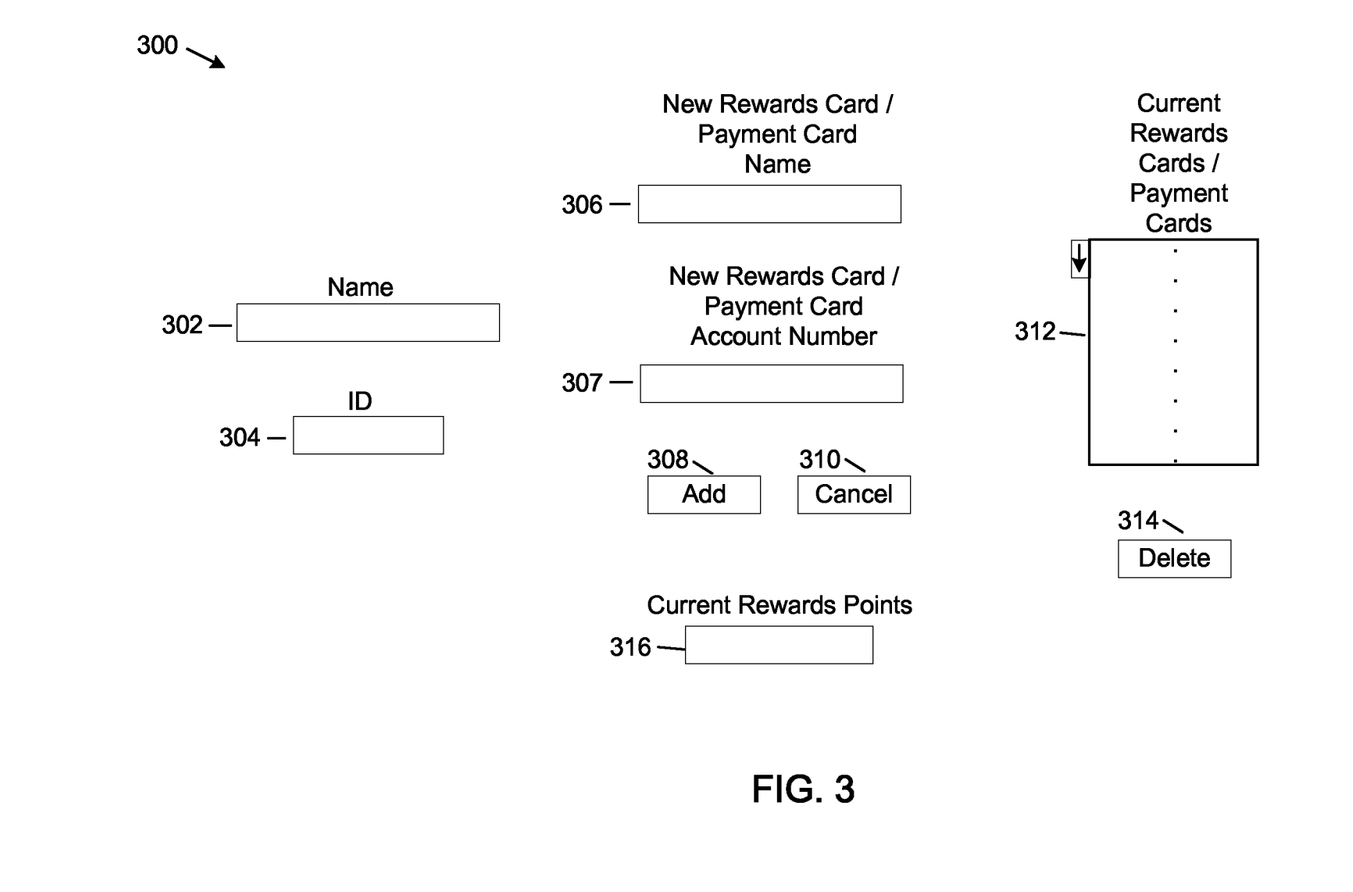
FIG. 3 shows an example user interface for a digital dashboard.

FIG. 3 shows an example user interface 300 for the digital dashboard. The example user interface 300 includes edit boxes for entering a name 302 and ID 304. The user interface 300 also includes edit boxes 306 and 307 for entering information for new rewards cards and payment cards. A name for the rewards card or payment card is entered into edit box 306 and an account number for the rewards card or payment card is entered into edit box 307. The example Add button 308 is then selected. When the Add button 308 is selected, the rewards card or credit card information entered into edit boxes 306 and 307 is sent to server computer 104. The name of the rewards card or credit card is also displayed in a current rewards cards/payment cards pull-down list box 312. An example Cancel button 310 is provided for canceling an entry of a rewards card or payment card in edit box 306.

The current rewards cards/payment cards pull-down list box 312 includes a list of all rewards cards and payment cards currently entered into system 100 for the user. The user may delete a rewards card or payment card from system 100 by selecting the rewards card or payment card to be deleted and then selecting the example Delete button 314.

The user interface 300 also includes a text box for current rewards points 316. The current rewards points 316 displays an amount of rewards points currently available to the user. When a purchase of a product is made and reward points are provided as a result of the purchase, the current rewards points 316 is increased by the amount of rewards points obtained from the purchase of the product.

Figure 4:
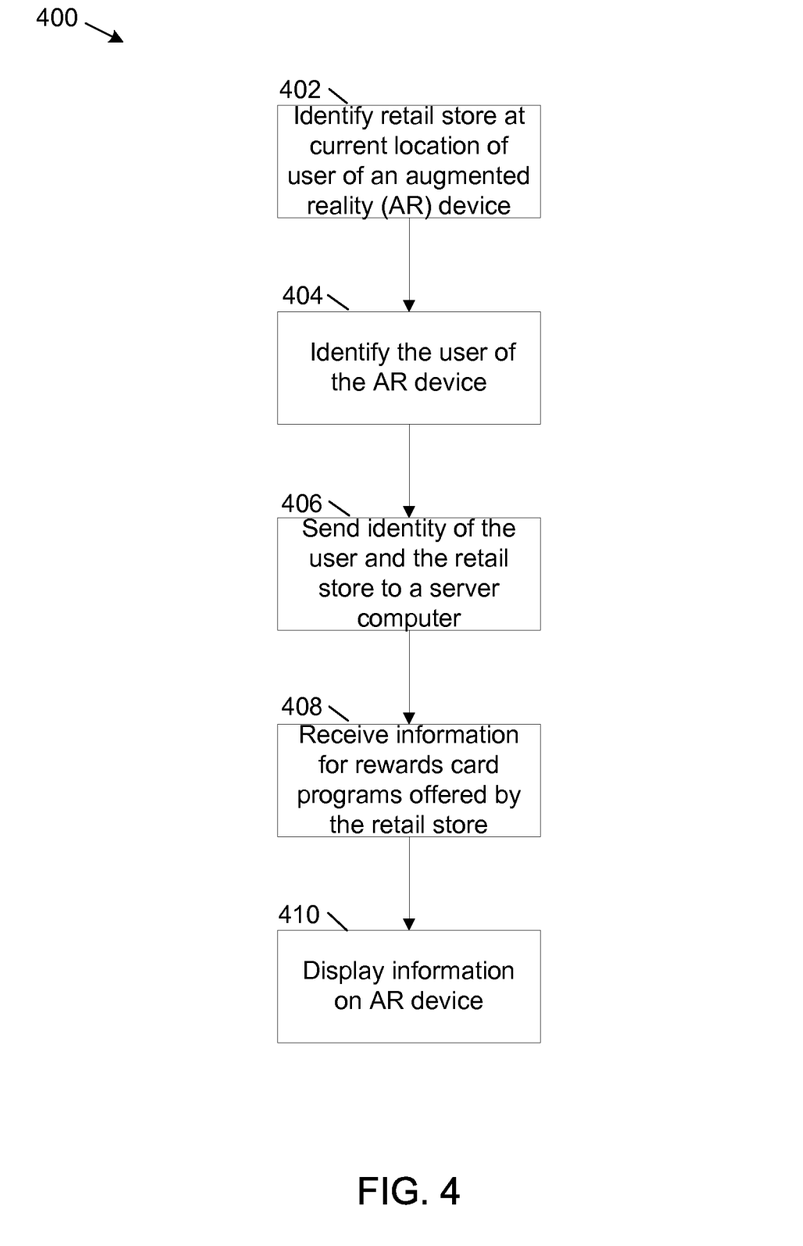
FIG. 4 shows a flowchart for an example method implemented on the AR device of FIG. 1 for displaying rewards card program information for a retail store on the AR device of FIG. 1.

FIG. 4 shows a flowchart of a method 400 implemented on an AR device for displaying rewards card program information for a retail store on a display screen of the AR electronic device. For the method 400, the AR device, for example AR device 102, is a smart glass type of headset such as Google Glass.

At operation 402, a retail store at a current location of the AR device is identified. In an example scenario, a user of the AR device is at a shopping mall and stops in front of a retail store. The user views signage of the retail store name with camera of the AR device. For the method 400, optical recognition software included on the AR device identifies the retail store from the signage. In addition, GPS software on the AR device determines a GPS location for the retail store.

At operation 404, the user of the AR device is identified. The user is identified by a biometric method of identification such as facial recognition, retinal scan, voice print or finger print scan. For example, when facial recognition is used, the camera on the AR device scans an image of the user's face. Optical recognition software on the AR device than compares the scanned image with a stored image of the user to confirm that the wearer of the AR device is the user.

At operation 406, when a determination is made that the wearer of the AR device is the user, an identifier for the user and an identifier for the retail store is sent to a server computer, for example to server computer 104. The identifier for the user may be the name of the user, a banking account number for the user or a special identifier for the user. The identifier for the retail store may be the name of the retail store, a special identifier for the retail store or the name or special identifier of the retail store combined with the GPS location for the retail store. Other identifiers are possible.

At operation 408, the server computer sends information to the AR device regarding rewards card programs offered to the user by the retail store. The rewards card programs are typically loyalty programs in which a user obtains discounts for using a rewards card associated with the loyalty program. The information may specify the rewards card programs, if any, that may be used at the retail store. The information may also specify an amount of any discounts available to the user at the retail store via the loyalty program. In some implementations, the information may also include alternate retail stores nearby that may offer rewards programs for the user. By viewing the rewards programs available at the alternate retail stores, the user may decide to shop at one of the alternate retail stores because the user may be able to get a better price or discount at one of the alternate retail stores.

At operation 410, the information is displayed on the display screen of the AR device. In some implementations, the displayed information may indicate which rewards programs offer a better deal for the user and may provide advice as to which rewards cards should be used and which alternate retail stores should be used.

Figure 5:
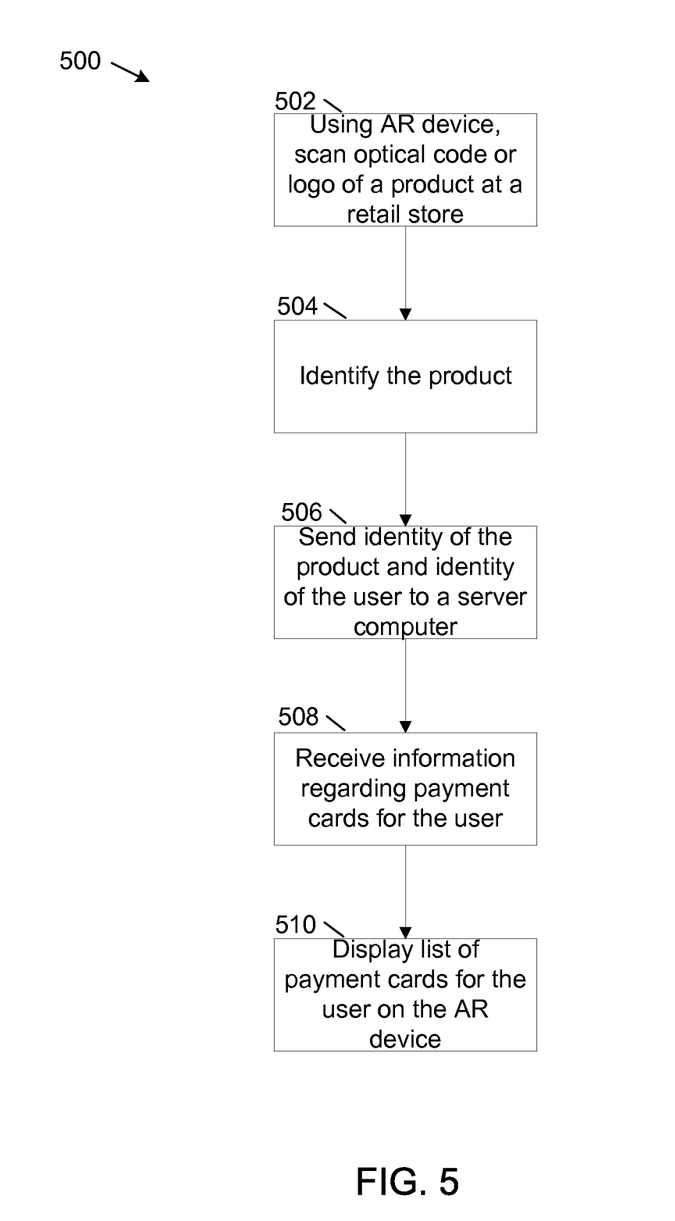
FIG. 5 shows a flowchart for an example method implemented on the AR device of FIG. 1 for displaying payment card information for a product purchased at a retail store on the AR device of FIG. 1.

FIG. 5 shows an example method 500 implemented on an AR device for displaying payment card information for a product purchased at a retail store. The information is displayed on a display screen of the AR electronic device, for example a display screen of AR device 102. For the method 500, the AR device is a smart glass type of headset such as Google Glass.

At operation 502, a user of the AR device scans an optical code or logo of a product at a retail store. The optical code or logo is scanned by a camera on the AR device when the user views the optical code or logo with the AR device. For the example method 500, the optical code is a bar code.

At operation 504, optical recognition software on the AR device is used to identify the product. The product may be identified by determining the product from recognition of the logo or by comparing the bar code of the product with bar codes of products stored or accessed from the AR device.

At operation 506, the identity of the product and the identity of the user are sent to a server computer, for example to server computer 104. At operation 508, information regarding payment cards for the user that may be used to purchase the product is received from the server computer from the AR device. The information may include a description regarding one or more payment cards that may be used, including reward points and cash awards that may be available when purchasing the product using each of the payment cards.

At operation 508, a list of the payment cards is displayed on the display screen of the AR device. In addition, information regarding possible rewards points and cash awards available for using each of the payment cards is also displayed. By viewing the information, the user can determine which payment card would be best to use when purchasing the product.

Figure 6:
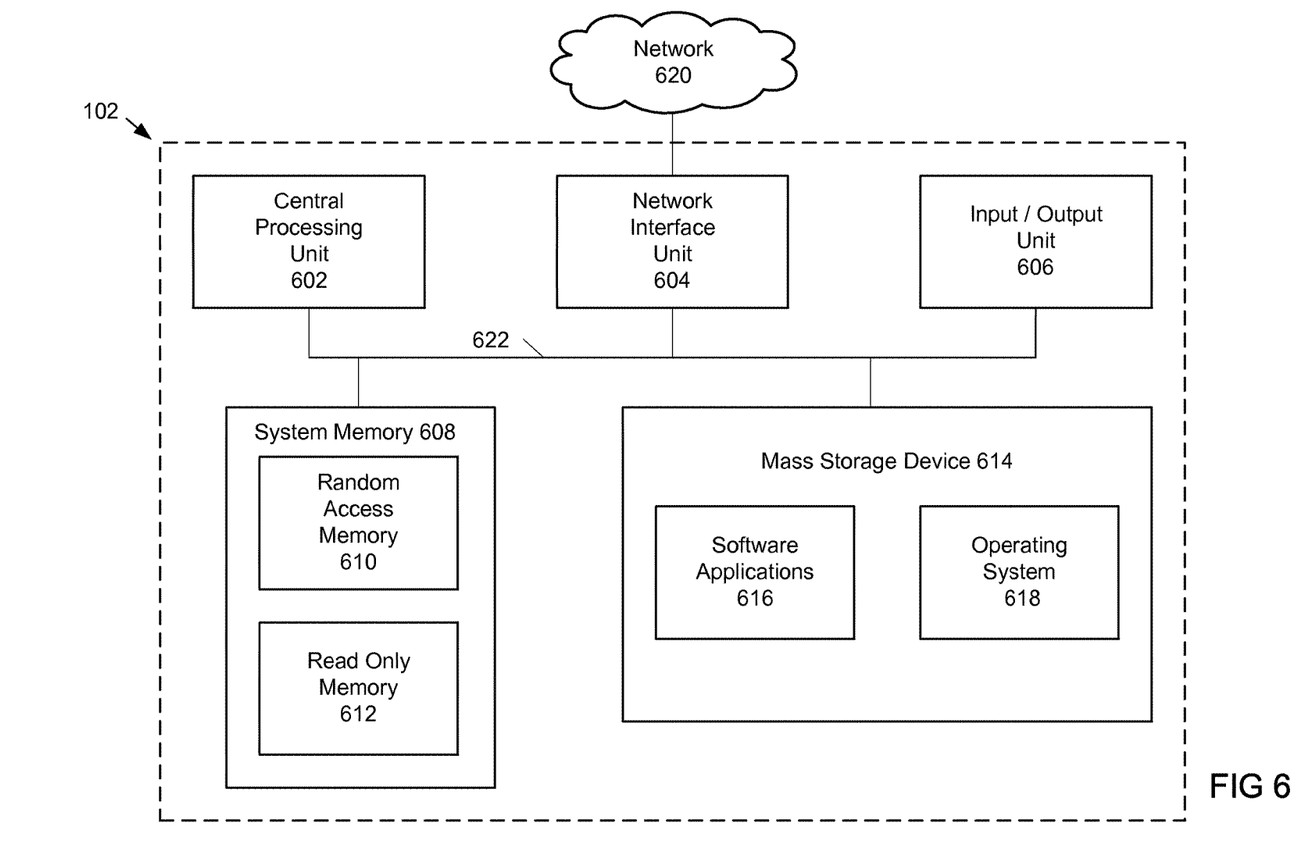
FIG. 6 shows example physical components of the AR device of FIG. 1.

As illustrated in the example of FIG. 6, the AR device 102 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the AR device 102, such as during startup, is stored in the ROM 612. The AR device 102 further includes a mass storage device 614. The mass storage device 614 is able to store software instructions and data. A central processing unit, system memory and mass storage device similar to that in FIG. 6 are also included in server computer 104.

The mass storage device 614 is connected to the CPU 602 through a mass storage controller (not shown) connected to the system bus 622. The mass storage device 614 and its associated computer-readable data storage media provide non-volatile, non-transitory storage for the AR device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the AR device 102.

According to various embodiments of the invention, the AR device 102 may operate in a networked environment using logical connections to remote network devices through the network 620, such as a wireless network, the Internet, or another type of network. The AR device 102 may connect to the network 620 through a network interface unit 604 connected to the system bus 622. It should be appreciated that the network interface unit 604 may also be utilized to connect to other types of networks and remote computing systems. The AR device 102 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the AR device 102 can store software instructions and data. The software instructions include an operating system 618 suitable for controlling the operation of the AR device 102. The mass storage device 614 and/or the RAM 610 also store software instructions, that when executed by the CPU 602, cause the AR device 102 to provide the functionality of the AR device 102 discussed in this document. For example, the mass storage device 614 and/or the RAM 610 can store software instructions that, when executed by the CPU 602, cause the AR device 102 to display received financial data on the display screen of the AR device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality (AR) electronic device, the method comprising:
   using facial recognition functionality on the AR electronic device to identify a user of the AR electronic device;
   after the user is identified using the facial recognition, receiving, at the AR electronic device, a verbal command to obtain information regarding rewards card programs offered at a current location of the user of the AR electronic device;
   as a result of receiving the verbal command, receiving at the AR electronic device a picture of indicia of a retail store at the current location of the user of the AR electronic device;
   identifying the retail store from the picture of the indicia;
   sending the identity of the retail store to a server computer;
   receiving from the server computer information regarding rewards card programs offered by the retail store that accept one or more rewards cards that the user possesses;
   displaying, on a display of the AR electronic device, the information regarding the rewards card programs offered by the retail store;
   providing, on the display of the AR electronic device, a list of payment cards and rewards cards that the user possesses that offer an optimized combination of rewards for products at the retail store location;
   receiving from the server computer information regarding rewards card programs offered for the user at similar retail stores at other locations near the current location that offer better prices or discounts than at the retail store; and displaying on the AR electronic device a list of the retail stores at the other locations that offer rewards card programs for the user that offer the better prices or discounts than at the retail store.

2. The method of claim 1, further comprising:
identifying the user of the AR electronic device;
sending the identity of the user to the server computer;
receiving from the server computer information regarding rewards card programs offered by the retail store that are available to the user; and
displaying on the AR electronic device the information regarding the rewards card programs offered by the retail store that are available to the user.

3. The method of claim 1, further comprising:
receiving information from the server computer regarding employment discount programs available to the user at the retail store; and
displaying on the AR electronic device the information regarding the employment discount programs available to the user at the retail store.

4. The method of claim 1, further comprising:
using the AR electronics device to scan an optical code or a logo of a product at the retail store; and
displaying on the AR electronic device rewards card rewards that are available for purchasing the product.

5. The method of claim 4, further comprising displaying one or more alternate products for which rewards card rewards are available.

6. The method of claim 4, further comprising displaying on the AR electronic device information regarding payment card rewards available to the user for purchasing the product.

7. The method of claim 4, further comprising displaying an indication of whether the product may be expensed on an expense report.

8. The method of claim 4, further comprising displaying on the AR electronic device a graphic indicating whether the product is affordable to the user.

9. An augmented reality (AR) device comprising:
a processing unit; and
system memory, the system memory including instructions which, when executed by the processing unit, cause the AR device to:
identify a product;
use facial recognition functionality on the AR electronic device to identify a user of the AR device;
after the user is identified using the facial recognition, receive, at the AR device, a verbal command to obtain information regarding rewards card programs offered at a current location of the user of the AR device;
as a result of receiving the verbal command, obtain a global positioning system (GPS) location of a retail store at the retail store location;
using the GPS location, obtaining an identity of the retail store;
send the identity of the product, the identity of the retail store and the identity of the user to a server computer;
receive from the server computer information regarding payment cards and loyalty card programs for the user for the product at the retail store;
display, on a display of the AR device, a list of one or more combination of payment cards and loyalty cards owned by the user that offer rewards for purchasing the product, one of the combinations being a combination that offers a best price for the product;
display, on the display of the AR device, one or more alternate products of a similar product category as the product for which one or more payment cards or loyalty cards for the user may be used;
display, on the display of the AR device, an identity of one more alternate retail stores in a vicinity of the location of the retail store that offer better rewards than the retail store for using the payment cards and loyalty cards of the user; and
display, on the display of the AR device, a recommendation as to which of the one or more alternate retail stores offer the better rewards than the retail store.

* * * * *